Patented Dec. 17, 1946

2,412,629

UNITED STATES PATENT OFFICE 2,412,629

METHOD OF PRODUCING WHIP

Alexander S. Miner, New York, N. Y.

No Drawing. Application February 9, 1942, Serial No. 430,086. In Germany August 19, 1937

4 Claims. (Cl. 99—60)

This invention relates to a method of producing whip or foam from milk derivatives and further to products obtained from such whip or foam.

It is known to produce whip from the cream of milk, said cream forming the fatty substances of the milk, the latter being freed from nearly all its watery constituents.

In contradistinction to this well-known process the present invention is directed to a process and products derived therefrom which process proposes the preparation of whip or foam from skimmed milk from which the fat or cream has been eliminated and in which only a very negligible part of fat may be present.

It is, therefore, an object of the present invention to provide an economical, efficient and practical method for producing a whip or foam from skim milk.

Another object of the present invention is to provide a method of preparing whip or foam from skim milk, which foam may be easily and quickly manufactured, is capable of being used in a variety of ways by changing its constituents, and assumes in its foamy state a multiple of the original volume of the starting material (skim milk).

Still another object of the present invention is to provide a method of converting skim milk into a foamy mass which can be easily carried out while the skim milk is in a cold state and without the necessity of employing other than conventional equipment therefor.

A further object of the present invention is to provide a delectable and digestible product from foam or whip of skim milk, which product may be kept in fresh state for a relatively long time.

Still a further object of the present invention resides in the provision of a product derived from foam of skim milk employed as an agent or diluent for effecting attenuation of whipped cream, particularly made from heavy cream.

Yet, another object of the present invention resides in providing an excellent substitute for and which has an appearance similar to that of ordinary whipped cream, but which is devoid of any fatty constituents and may be consumed by persons inclining to obesity.

These and other objects of the invention will appear, as the description proceeds, it being understood, however, that it is not intended that the invention be limited to the exact details described herein which illustrates the production of some products of many, which may be obtained through or gleaned from an understanding of the invention; and it is further intended that there be included, as part of the invention all such obvious changes and modifications thereof as would occur to a person skilled in the art to which this invention pertains and as would fall within the scope of the claims.

According to the present invention it has been found that skim milk either obtained from the milk of the cow, from which milk the fat is eliminated, or derived from pulverized substances containing skim milk in a dry state and adequately diluted in water may be whipped and converted into foam or whip even without the addition of any further ingredients if the skim milk possesses hardly any fat content. Even in small quantities the fat counteracts the whipping effect and it has been found that, for instance, in the presence of .05 to .1 part by weight of fat the whipping of the skim milk will hardly be influenced. For the purpose of manufacturing foam or foamy products from skim milk it is preferable not to use skim milk derived from the milk of the cow, but in the form of powder, which is cheaper and more durable than the liquid skim milk. It has further been found that skim milk can be obtained by dissolving 1 part of skim milk powder in about 8 to 9 parts of water; thus, it is possible to carry out the present invention by using, for instance, about 100 to 130 grams of skim milk powder in about 870 to 900 grams of water. During the winter season it may be even advisable to use only 50 grams of skim milk powder in 950 grams of water.

The possibility to whip fatless or skim milk and the firmness of the foam derived therefrom depends mainly on the temperature under which the whipping operation is effectuated. It is of importance that said milk be cooled before the whipping takes place, to a temperature close to zero (0°) C., such as between about 1° to 5° C. or sometimes somewhat higher. Skim milk thus subjected to a whipping operation assumes a volume of four to six times of that of the starting material (skim milk), and possesses a consistency which is retained for a considerable period of time and which will be already apparent during a relatively short whipping operation after a few minutes.

If a very stable foam is desired a solidifying agent, such as, for instance, gelatine may be added to the foam immediately after the whipping takes place and which agent may be uniformly mixed with the foam during the whipping operation. The proportion of solidifying agent may be kept extremely small, so that it does not noticeably influence the taste of the foam. It is well understood that the whipping operation may be executed by means of any known machines or equipment. The taste of the foam and its appearance may be improved by adding thereto ingredients, such as sugar, fruit juices, cocoa, chocolate, syrup, grated cheese, or medicinal substances, which may be added after the foam has been produced. These ingredients may also be added in mixture containing starch, maize meal, or similar binders. Solid additions should be carefully ground before they are used; such solid additions being, for instance, sugar, fruit pulp, grated lemon peel, coffee or cocoa powder, ground almonds, and the like. As liquid additions for improving the taste materials, such as strong coffee infusion, orange juices or the like may be used. In order to produce a durable solid dish, the foam made in accordance with the invention may be mixed under constant whipping operation with a binder. Binders which are preferably soluble in warm water and which solidify on cooling are useful, and the whipping may be continued until the binder is uniformly distributed in the foam, which is generally achieved in .5 to 1 minute. While the low temperature still prevails, a gelatine solution obtained from dissolving of 35 to 45 grams of gelatin in water may be added to the foam made from 1 litre of skim milk. After the binder has been added to the foamy mass, the latter may be poured into any container in which it solidifies and may be either directly consumed while still semi-fluid, or may be preserved for quite some time. In this state, the gelatin containing foamy mass may be used as an addition to whipped cream, or in any other suitable way as an addition or filling means for other dishes.

Instead of using a foamy mass containing the solidifying agent, such as gelatine, the mass without said binder may be employed with the addition of vinegar, citric acid, tartaric acid, or the like. For example, 45 grams of commercial essence of vinegar containing about 10.5% of acetic acid may be added to 1 litre of skim milk.

In the case of industrial production, an acetic acid of 80 to 84% may be used and which is diluted with water in the proportion of 1 to 7. The use of an acid addition consisting of 10% solution of crystallized citric or tartaric acid in water has been found suitable for the purpose intended. If additions, such as sugar, are incorporated in the foamy mass after the whipping operation, the foam should preferably be whipped again while a further quantity of acid substance is added, in which case the first addition made to the skim milk before whipping should be kept relatively smaller and should not be higher than ⅓ to ⅔ of the total acid substance added thereto. It is further possible to combine those additions in such a manner that an acid substance may be added before the whipping takes place, and a binder after the whipping operation is terminated and after the addition of taste improving ingredients, if any. It is further suitable in some instances to add a second acid substance, preferably after the addition of the binder.

Preferred examples are given in order to further explain the invention in greater detail and in what manner the same may be realized.

100 grams of skim milk powder are diluted with 900 ccm. of water and the thus prepared skim milk is then cooled down to approximately 2° C. preferably during several hours (in practice preferably over night). The sufficiently cooled skim milk is then whipped by any conventional whipping equipment and a foamy mass is obtained within one or more minutes, whose consistency may be maintained for quite some time (approximately 15 and more minutes). After the whipping operation, 1.1 lbs. of finely granulated sugar may be added and distributed in the mass by further whipping operation.

In order to make the foamy mass more durable, acid substance or similar ingredients may be added before, during, or after the whipping operation. To this end, it is proposed to add 10% citric acid diluted in water, 25 ccm. thereof being added to 1 litre of liquid skim milk immediately before the whipping operation, whereas 30 ccm. of said citric acid are added to the foamy mass directly after the whipping operation.

In order to prepare a product from the thus prepared foamy mass so that the same is durable and may be kept in fresh state for several days, a binder, such as gelatine, which coagulates in cold state, may be added to the mass.

In order to obtain a new food product derived from such foamy mass the following ingredients and quantitative relation may be observed:

1 litre of skim milk (either obtained from the milk of the cow or from skim milk powder diluted with water), 2 lemons, 1.1 lbs. of finely granulated sugar, 38 grams of gelatine, 55 ccm. of 10% citric acid solution may be employed to arrive at a durable mass or dish. To the skim milk, after it has been cooled down, 25 ccm. of said acid solution are added and the thus prepared skim milk is subjected to a whipping operation. As soon as foam is produced therefrom, the same may be admixed with sugar and further with the ground peels from said 2 lemons, further gelatine in liquid state is added and also the remainder of the citric acid solution and the juice of said 2 lemons as well.

Instead of preparing a food product as just referred to, the foamy mass herein above described may be mixed in a proportion of 50:50 with whipped cream. In practice, the foamy mass with addition of a binder, such as gelatine, may be used, if desired, or even the new food product before it becomes firm may be admixed to the whipped cream in a proportion of 50:50. The resultant product possesses a creamy taste.

In addition to those examples, it is proposed according to this invention to mix the foamy mass with conventional already prepared pudding substances in pulverized form, whereby the price for such puddings may be considerably reduced, and a creamy character imparted to such pudding preparations. Instead of diluting pudding powder in milk, cream, or water the pudding can be prepared according to the invention by adding the pudding powder to the foam of skim milk.

While I have described certain preferred embodiments of my invention and have set forth certain proportions of ingredients, and particular methods of carrying out the process of my invention, it will be understood that these are by way of example only, and not in limitation, and that the ingredients used in the mix may be varied in kind and in proportion, and the temperature may be varied as may be found to yield the particular taste and/or consistency desired, in any particular case.

Having thus described the invention what I claim as new and desire to secure by Letters Patent is:

1. The method of producing a foamy product, which consists in cooling skimmed milk containing not more than approximately .05 to .1 part by weight of fat to a temperature close to the freezing point, and then whipping said cooled skimmed milk until a foam results therefrom.

2. The method as described in claim 1, characterized in that the resultant of said whipped skimmed milk is solidified immediately after the whipping operation by addition of a binder.

3. The method as claimed in claim 1, characterized in that the resultant of said whipped skimmed milk is mixed with taste improving ingredients.

4. The method as claimed in claim 1, characterized in that the resultant of said whipped skimmed milk is mixed with taste improving ingredients containing acid.

ALEXANDER S. MINER.